US008807067B2

(12) United States Patent
Eriksson et al.

(10) Patent No.: US 8,807,067 B2
(45) Date of Patent: Aug. 19, 2014

(54) TOOL FOR THE APPLICATION OF A REPAIR COATING TO A METALLIC SURFACE

(71) Applicant: Chemetall GmbH, Frankfurt am Main (DE)

(72) Inventors: Mats Eriksson, Ytterby (SE); Manfred Walter, Linsengericht (DE)

(73) Assignee: Chemetall GmbH (DE)

( * ) Notice: Subject to any disclaimer, the term of this patent is extended or adjusted under 35 U.S.C. 154(b) by 0 days.

(21) Appl. No.: 13/738,523

(22) Filed: Jan. 10, 2013

(65) Prior Publication Data

US 2013/0295279 A1  Nov. 7, 2013

Related U.S. Application Data

(60) Division of application No. 13/326,774, filed on Dec. 15, 2011, now Pat. No. 8,409,661, which is a continuation of application No. 12/082,841, filed on Apr. 15, 2008, now Pat. No. 8,101,232, which is a division of application No. 10/985,652, filed on Nov. 10, 2004, now abandoned.

(51) Int. Cl.
B05C 5/02 (2006.01)
B05C 1/00 (2006.01)
B05D 7/14 (2006.01)

(52) U.S. Cl.
USPC ............................ 118/200; 118/300; 427/140

(58) Field of Classification Search
USPC .......... 427/140; 118/200, 206, 255, 264–269, 118/300
See application file for complete search history.

(56) References Cited

U.S. PATENT DOCUMENTS

| 4,063,016 A | 12/1977 | Austin |
| 4,112,151 A | 9/1978 | Cooke |
| 4,311,738 A | 1/1982 | Chi |
| 4,452,918 A | 6/1984 | Uchida et al. |
| 4,457,790 A | 7/1984 | Lindert et al. |
| 4,617,056 A | 10/1986 | Mosser et al. |
| 4,659,394 A | 4/1987 | Hara et al. |
| 4,959,180 A | 9/1990 | Armes et al. |
| 4,986,886 A | 1/1991 | Wei et al. |
| 5,053,081 A | 10/1991 | Jacob |
| 5,108,793 A | 4/1992 | van Ooij et al. |
| 5,174,867 A | 12/1992 | Naarmann et al. |
| 5,246,507 A | 9/1993 | Kodama et al. |
| 5,324,545 A | 6/1994 | Flamme |
| 5,415,893 A | 5/1995 | Wiersma et al. |
| 5,451,431 A | 9/1995 | Purnell et al. |
| 5,482,655 A | 1/1996 | Vogel et al. |
| 5,531,820 A | 7/1996 | Gorecki |
| 5,593,731 A | 1/1997 | Akagi et al. |
| 5,700,523 A | 12/1997 | Petrole et al. |
| 5,868,820 A | 2/1999 | Claffey |
| 5,885,711 A | 3/1999 | Clarisse et al. |
| 5,905,109 A | 5/1999 | Shimizu et al. |
| 5,968,417 A | 10/1999 | Viswanathan |
| 6,051,670 A | 4/2000 | Ahmed et al. |
| 6,054,514 A | 4/2000 | Kulkarni et al. |
| 6,068,711 A | 5/2000 | Lu et al. |
| 6,132,645 A | 10/2000 | Hedges |
| 6,180,177 B1 | 1/2001 | Nagashima et al. |
| 6,203,854 B1 | 3/2001 | Affinito |
| 6,319,351 B1 | 11/2001 | Dixon |
| 6,328,874 B1 | 12/2001 | Kinlen et al. |
| 6,458,219 B2 | 10/2002 | Chihara et al. |
| 6,478,886 B1 | 11/2002 | Kunz et al. |
| 6,482,274 B2 | 11/2002 | Shimakura et al. |
| 6,514,357 B1 | 2/2003 | Tada et al. |
| 6,572,983 B2 | 6/2003 | Shimakura et al. |
| 6,589,324 B2 | 7/2003 | Kamo et al. |
| 6,596,835 B1 | 7/2003 | Brown et al. |
| 6,623,791 B2 * | 9/2003 | Sadvary et al. ............... 427/140 |
| 6,649,273 B2 | 11/2003 | Iwato et al. |
| 6,794,046 B1 | 9/2004 | Kurze et al. |
| 6,805,756 B2 | 10/2004 | Claffey et al. |
| 6,875,479 B2 | 4/2005 | Jung et al. |
| 6,875,514 B2 | 4/2005 | Sormani et al. |

(Continued)

FOREIGN PATENT DOCUMENTS

| CA | 1 211 406 A1 | 9/1986 |
| CN | 1195025 C | 3/2005 |

(Continued)

OTHER PUBLICATIONS

Assaf Fawzi Hassan "Inhibiting Effects of Group 6 Oxo-Anions on the Pitting Corrosion of Tin in Citrate-Chloride Solution", *Bull. Chem. Soc. Jpn.*, 73 (2000), pp. 561-568.

De Souza, et al.: "Polyaniline based acrylic blends for iron corrosion protection", *Electochem. and Solid State Letters* 4 (8) (2001) B27-B30.

Duc Le Minh "The Role of Anions in Corrosion Protection of Iron and Zinc by Polypyrrole", PhD Dissertation, Dresden, Germany (Sep. 4, 2005).

"Chapter: Pyrrole and Pyrrole Derivatives", Kirk-Othmer Encyclopedia of Chemical Technology, Wiley (2000), p. 2.

Harper, et al. "Pallics Materials and Processes: A Cibcuse Encyclopedia", Wiley (2003), pp. 95-96.

(Continued)

*Primary Examiner* — William Phillip Fletcher, III
(74) *Attorney, Agent, or Firm* — Fulbright & Jaworski LLP

(57) ABSTRACT

A tool and a process for producing a repair coating on at least one metallic surface that is coated with at least one corrosion protecting coating A applied with at least one composition selected from the group of pretreatment compositions, of organic compositions and of silicon compound(s) containing compositions. Corrosion protecting coating A has been at least partially removed in area Z. Corrosion protecting coating B contains a silicon compound and is applied as a solution or dispersion containing a silane, a silanol, a siloxane, a polysiloxane or mixture thereof on at least a part of the area Z. A further corrosion protecting coating C may be applied. The tool is provided for use in the process.

4 Claims, No Drawings

(56) References Cited

U.S. PATENT DOCUMENTS

| | | |
|---|---|---|
| 6,942,899 B2 | 9/2005 | Kendig et al. |
| 7,033,673 B2 | 4/2006 | Wiedemann et al. |
| 7,344,607 B2 | 3/2008 | Melzer et al. |
| 7,452,428 B2 | 11/2008 | Koch et al. |
| 7,510,612 B2 | 3/2009 | Matsukawa et al. |
| 8,101,232 B2 | 1/2012 | Eriksson et al. |
| 2001/0012078 A1 | 8/2001 | Hira et al. |
| 2001/0031416 A1 | 10/2001 | Everaars et al. |
| 2001/0031811 A1 | 10/2001 | Li et al. |
| 2002/0091195 A1 | 7/2002 | Paar et al. |
| 2003/0185990 A1 | 10/2003 | Bittner et al. |
| 2004/0022950 A1 | 2/2004 | Jung et al. |
| 2004/0022951 A1 | 2/2004 | Maurus et al. |
| 2004/0029395 A1 | 2/2004 | Zhang et al. |
| 2004/0054044 A1 | 3/2004 | Bittner et al. |
| 2004/0062873 A1 | 4/2004 | Jung et al. |
| 2004/0065389 A1 | 4/2004 | Kolberg et al. |
| 2004/0129346 A1 | 7/2004 | Kolberg et al. |
| 2004/0149961 A1 | 8/2004 | Konuma et al. |
| 2004/0149963 A1 | 8/2004 | Sinko et al. |
| 2004/0167266 A1 | 8/2004 | Hasegawa et al. |
| 2004/0168748 A1 | 9/2004 | Hartwig et al. |
| 2004/0170840 A1 | 9/2004 | Matsukawa et al. |
| 2005/0037208 A1 | 2/2005 | Ogino et al. |
| 2006/0093755 A1 | 5/2006 | Bittner et al. |
| 2006/0099429 A1 | 5/2006 | Domes et al. |
| 2006/0127681 A1 | 6/2006 | Domes et al. |
| 2007/0298174 A1 | 12/2007 | Kolberg et al. |
| 2008/0127859 A1 | 6/2008 | Kolberg et al. |
| 2008/0138615 A1 | 6/2008 | Kolberg et al. |
| 2008/0171211 A1 | 7/2008 | Plieth et al. |
| 2008/0175992 A1 | 7/2008 | Plieth et al. |
| 2008/0286470 A1 | 11/2008 | Matsukawa et al. |
| 2008/0305341 A1 | 12/2008 | Plieth et al. |
| 2010/0038250 A1 | 2/2010 | Matsukawa et al. |
| 2011/0039115 A1 | 2/2011 | Domes et al. |

FOREIGN PATENT DOCUMENTS

| | | |
|---|---|---|
| DE | 31 51 115 A1 | 9/1982 |
| DE | 41 38 218 A1 | 5/1993 |
| DE | 43 34 628 A1 | 1/1995 |
| DE | 198 14 605 A1 | 10/1999 |
| DE | 100 16 181 A1 | 11/2000 |
| DE | 199 19 261 A1 | 11/2000 |
| DE | 199 56 383 A1 | 5/2001 |
| DE | 101 49 148 A1 | 5/2002 |
| DE | 10 308 237 A1 | 9/2004 |
| EP | 0 153 973 A1 | 9/1985 |
| EP | 0 492 306 A2 | 7/1992 |
| EP | 0 687 715 A2 | 12/1994 |
| EP | 0 676 420 B1 | 10/1995 |
| EP | 0 824 127 A2 | 2/1998 |
| EP | 0 949 353 A1 | 10/1999 |
| EP | 0 952 193 A1 | 10/1999 |
| EP | 1 130 132 A2 | 9/2001 |
| EP | 1 130 133 A2 | 9/2001 |
| EP | 1 146 144 A1 | 10/2001 |
| EP | 1 382 721 A1 | 1/2004 |
| EP | 1 426 466 A1 | 6/2004 |
| EP | 1 433 875 A1 | 6/2004 |
| EP | 1 433 876 A1 | 6/2004 |
| EP | 1 433 877 A1 | 6/2004 |
| EP | 1 433 878 A1 | 6/2004 |
| EP | 1 051 478 B1 | 11/2004 |
| EP | 1 390 564 B1 | 2/2009 |
| GB | 1 528 715 | 10/1978 |
| JP | 52-117930 | 10/1977 |
| JP | 52-135340 | 11/1977 |
| JP | 11-106945 | 4/1999 |
| JP | 2001-192852 | 7/2001 |
| JP | 2001-311037 | 11/2001 |
| JP | 2001-329379 | 11/2001 |
| JP | 2004-218070 | 8/2004 |
| JP | 2004-218075 | 8/2004 |
| JP | 2004-527654 A | 9/2004 |
| JP | 2005-008982 | 1/2005 |
| TW | 408194 B | 10/2000 |
| WO | WO 93/14166 A | 7/1993 |
| WO | WO 94/11885 A | 5/1994 |
| WO | WO 96/17109 A1 | 6/1996 |
| WO | WO 97/34137 A2 | 9/1997 |
| WO | WO 00/46310 A1 | 8/2000 |
| WO | WO 01/38605 A2 | 5/2001 |
| WO | WO 01/90267 A2 | 11/2001 |
| WO | WO 02/70782 A2 | 2/2002 |
| WO | WO 02/24344 A2 | 3/2002 |
| WO | WO 02/31062 A2 | 4/2002 |
| WO | WO 02/31063 A2 | 4/2002 |
| WO | WO 02/31065 A2 | 4/2002 |
| WO | WO 02/31222 A2 | 4/2002 |
| WO | WO 02/070781 A2 | 9/2002 |
| WO | WO 03/027203 A | 4/2003 |
| WO | WO 03/035280 A2 | 5/2003 |
| WO | WO 03/083171 A1 | 10/2003 |
| WO | WO 03/102034 A1 | 12/2003 |
| WO | WO 2004/055238 A1 | 7/2004 |
| WO | WO 2004/076568 A1 | 9/2004 |
| WO | WO 2004/076717 A1 | 9/2004 |
| WO | WO 2004/076718 A1 | 9/2004 |
| WO | WO 2004/101693 A1 | 11/2004 |

OTHER PUBLICATIONS

Kupila, et al. "Redox processes in thick films of polypyrrole/dodecylsulfate in the presence of alkali and tetramethylammonium chlorides", *Synthetic Metals*, 74 (1995) pp. 207-215.

Newman, et al., Electrochem. Systems, Wiley (2004).

Njuguna, et al. "Recent developments in polyurethane-bacsed conducting composites", *J. Material Sci.* 39 (2004) pp. 4081-4094.

Pal, Rheology of Particulate Dispersions and Composites, CRC Press (2006), p. 8.

Ruckenstein, et al.: "An emulsion pathway to electrically conductive polyaniline-polystyrene composites", *Synthetic Metals*, 53 (1993) pp. 282-292.

Szycher, Szycher's Handbook of Polyurethanes, CRC Press (1999).

Tallman, et al.: "Electroactive conducting polymers for corrosion control", *J. Solid State Electrochem.* (2002) 6 pp. 73-84.

Totten, et al. "Handbood of Aluminum", vol. 2 CRC Press (2003), p. 476.

Wiersma, et al. "Waterborne core-shell dispersions based on intrinsically conducting polymers for coating applications", *Synthetic Metals* 71 (1995), pp. 2269-2270.

Yang, et al.: "Processable conductive composites of polyaniline/poly(alkyl methacryalte) prepared via an emulsion ethod", *Synthetic Metals* 59 (1993) pp. 1-12.

Yui, et al.: "Reflexive Polymers and Hydrogels: Understanding and Designing Fast Responsive Polymeric Systems", CRC (2004).

Definition of "siloxane" from Alger, Mark, Ed., "Polymer Science Dictionary, $2^{nd}$ Ed." Copyright 1989 Chapman & Hall, 1997 Mark Alger, p. 522.

* cited by examiner

TOOL FOR THE APPLICATION OF A REPAIR COATING TO A METALLIC SURFACE

This application is a divisional of U.S. Ser. No. 13/326,774 filed Dec. 15, 2011, now U.S. Pat. No. 8,409,661, which is a continuation of U.S. Ser. No. 12/082,841 filed Apr. 15, 2008, now U.S. Pat. No. 8,101,232, which is a divisional of U.S. patent application Ser. No. 10/985,652 filed Nov. 10, 2004, abandoned, each of which is a hereby incorporated by reference in its entirety.

FIELD OF THE INVENTION

The present invention is directed to a process for producing a repair coating on at least one metallic surface that is already coated with at least one corrosion protecting coating like a primer coating, a paint coating or a siloxane/polysiloxane rich coating or any combination of these coatings. Such repair may be of specific interest in the field of car production e.g. after the application of an electrocoat (e-coat), in the repair of a primed or painted car body or parts of it, in the repair of construction components, in the repair of bodies of aerospace or railcar bodies and other coated metallic surfaces.

BACKGROUND OF THE INVENTION

During the production of car bodies and other coated metallic components, especially of coated metallic sheets, more preferred for hot, warm or cold formed metallic sheets, there are a lot of points and areas with flaws that may be seen after finishing e.g. the painting process with a multilayer of paints e.g. of a primer coating like an electrocoated first paint coating, a base-coat and a clear-coat. The clear-coat may be used on top of the paint system. The flaws may be caused by the presence of particles, fibres, pieces of fluff and other materials generating flaws with a diameter or thickness of at least 10 µm or seldom of at least 4 µm diameter or thickness or e.g. by the agglomeration of at least predominantly organic material gathering to small, but significantly visual elevations in the ground or e.g. by big pores or craters. Such flaws may occur after every painting stage so that such areas often are treated by removing at least a part of the clear coating or e-coat or both, perhaps even all the coatings in an area at and around each flaw so that in the middle of the area typically the surface of the blank metallic surface is uncovered and perhaps even taken away a thin part of the metallic base material. On the other hand, it may be necessary to remove at least one coating in an area that is damaged or that shows more or less corrosion like any form of rust. Then, e.g. the rust has to be removed. The removal of the coatings in such areas may occur e.g. by sanding, by sand-blasting, by grinding or by paint stripping the coated metallic components. The paint stripping may occur with the aid of chemicals. This removal determines the size and shape of the removal area Z.

It was one object of the invention to propose a repair coating process which may be used in an automated process or may be used in an easier, a cheaper or better process than conventional repair processes. It was an object of the invention to propose a repair process with a less amount of primers or paints to be applied for repair than today typically used in praxis. It was further on an object of the invention to improve the corrosion resistance and paint adhesion of such coatings generated during a repair process.

SUMMARY OF THE INVENTION

The present invention relates to a process for producing a repair coating on at least one metallic surface that is coated with at least one corrosion protecting coating A applied with at least one composition selected from the group of A1) pretreatment compositions like activating compositions, passivating compositions, phosphating compositions, titanium compound(s) or zirconium compound(s) or both of them containing compositions and after-rinse-compositions, A2) organic compositions like primers, wet-primers, welding primers, e-coats, powder coats, base-coats and clear-coats and of A3) silicon compound(s) containing compositions that are solutions or dispersions containing at least one silicon compound selected from silanes, silanols, siloxanes and polysiloxanes and, whereby the at least one corrosion protecting coating A has been at least partially removed in the area Z, whereby a thin corrosion protecting coating B containing at least one silicon compound is applied with a solution or dispersion containing at least one silane, at least one silanol, at least one siloxane, at least one polysiloxane or any mixture of these (="siloxane composition") on at least a part of the area Z.

Further on, the invention refers to a tool suitable for applying a process as indicated before, whereby the tool contains and dispenses a composition which is a solution or dispersion containing at least one silicon compound selected from silanes, silanols, siloxanes and polysiloxanes.

Preferably, the removal area Z is prepared in such way where it is intended to lay open the blank metallic material that only a certain percentage of this area is laid open, e.g. a surface in the range of 40 to 85% of this removal area Z. In such cases, it is easier to coat on the one-hand-side the blank metallic material completely with a thin film B, whereas it is avoided that a thin film B is applied outside the removal area Z.

After the coating of at least a part of the removal area Z with at least one thin film of the coating B by applying a siloxane composition, there may be applied a coating C preferably only within the removal area Z or only on the removal area Z and in a small rim outside of it. Such coating C may preferably be prepared by application of a repair primer, a surface primer, a base-coat, a clear-coat or any combination of these. Alternatively, especially if the coating A that was at least partially removed was a coating A3 originally prepared with the aid of a siloxane composition, then it is more preferred to apply a coating C with the aid of a siloxane composition that is applied upon the coating B applied before with the aid of the same or another siloxane composition. In many cases it is preferred that the repair of a area to be repaired does not or nearly not show any difference to the surrounding coated area if there is applied at least one further coating C that is applied over the total surface.

Additionally, the invention refers to a tool suitable for applying a process according to claim 1, whereby the tool is a spray can, a spray instrument or a stick having a storage chamber containing a composition which is a solution or dispersion containing at least one silicon compound selected from silanes, silanols, siloxanes and polysiloxanes.

Additionally, the invention refers to a tool suitable for applying a process according to claim 1, whereby the tool contains a paste which is a composition containing at least one silicon compound selected from silanes, silanols, siloxanes and polysiloxanes and whereby the tool transmits or releases a portion of the paste when it is brought into contact with the surface to be coated.

DETAILED DESCRIPTION OF THE INVENTION

The present invention concerns a repair coating process for the repair of the coatings of coated metallic surfaces to generate coatings being corrosion resistant and showing good adhesion for a further on it applied next coating.

The corrosion protecting coatings A, B, C or any combination of these are prepared by applying the respective compositions preferably and typically in a wet stage as solution or dispersion and by drying. Organic compositions may have optionally been further applied by heating up to cause a crosslinking. The organic corrosion protecting coatings A2 may optionally be coatings of primers or paints or specific organic compositions like welding primers.

The silanols as well as the siloxanes may be monomers, oligomers, polymers or any mixture of them. Therefore, any of the siloxane compositions for the coatings A, B, C or any combination of these may contain any mixture of compounds selected from the group of the monomers of silanes, silanols and siloxanes, of oligomers of silanols and siloxanes and of polymers of silanols and siloxanes whereby the last ones are polysiloxanes. In the following, the "siloxane composition" means a solution or a dispersion that contains at least one silane, at least one silanol, at least one siloxane, at least one polysiloxane or any mixture of these.

According to the process of the invention, a thin film B of the siloxane composition is applied which is preferably without particles, fibres, pieces of fluff and other materials generating flaws having a diameter or thickness of no more than 10 μm, more preferred of no more than 8 μm, most preferred of no more than 6 μm, especially of no more than 4 μm.

According to the process of the invention, a thin film B of the siloxane composition is applied which preferably has a wet film thickness in the range from 0.005 to 40 μm, more preferred in the range from 0.01 to 30 μm, most preferred in the range from 0.03 to 15 μm.

The thin film B of the siloxane composition is applied which preferably has a dry film thickness in the range from 0.001 to 3 μm, more preferred in the range from 0.005 to 1 μm, most preferred in the range from 0.008 to 0.5 μm, often in the range from 0.01 to 0.2 μm. If necessary to reach the required film thickness, the thin film B may be applied at least two times one after the other.

According to the process of the invention, a thin film B of the siloxane composition is applied and this thin film is then dried, e.g. at a temperature in the range from 5 to 300° C., more preferred the thin film B is then dried at a temperature in the range from 10 to 250° C., most preferred it is then dried at a temperature in the range from 12 to 150° C., especially it is then dried at a temperature in the range from 14 to 125° C.

This thin film B is preferably applied with the siloxane composition and dried by self-drying e.g. at about room temperature or at a temperature in the range from 8° C., to about 60° C., by heating the coated metallic substrate, by heating with hot air, by blowing or heating with a hot gas stream or by any combination of these.

According to the process of the invention, a thin film B of the siloxane composition is preferably applied by contacting a tool that contains and dispenses the siloxane composition. In another embodiment, the thin film B of the siloxane composition is preferably applied by spraying the siloxane composition e.g. with a spray can like an aerosol can or with an automated spraying instrument like e.g. an airless high pressure spray instrument, especially for a long-term discontinuous spraying of the siloxane composition. Especially for a spraying process, it may be helpful to take care for an adequate viscosity of the siloxane composition and that no drops will be generated. In a further embodiment, the thin film B of the siloxane composition is preferably applied by using a tool that has a storage chamber for the siloxane composition. Alternatively, the thin film B of the siloxane composition is preferably applied by using a tool like a brush, like a sponge, like a tampon, like a stick or like a gel-pack. This stick may essentially have the shape of a stick or may essentially have the shape of a box, e.g. a flat box, having essentially the function of a stick like a paint stick. Such stick or box may have a membrane or any similar porous material or alternatively have no membrane and no similar porous material if the solution or dispersion of the siloxane composition has an adequate consistency e.g. of a paste. Additionally, a thin film B of the siloxane composition is preferably applied by using a tool with a storage chamber having a membrane or another porous material with the ability to transmit the siloxane composition from the storage chamber to the working surface of the tool. The materials of the tool that are in contact with the siloxane composition should either not chemically react with the siloxane composition or only react in such way and extent that the coating and repair process and the properties of the resulting coatings are not impaired.

According to the process of the invention, the siloxane composition has preferably a viscosity in the range from 1 to 250 mPa·s measured at 20° C. In some embodiments, the viscosity may show values measured according to DIN 53211 4 mm-cup at 20° C., in the range from 5 to 45 s, especially in the range from 10 to 40 s. Alternatively, the solution or dispersion of the siloxane composition may have a viscosity in such way that it is a paste.

According to the process of the invention, the siloxane composition is applied to at least one metallic surface preferably of iron, steel, zinc-coated or zinc-alloy-coated steel, aluminium, aluminium alloy, magnesium alloy, titanium, titanium alloy or to any combination of these. The zinc-containing metallic coatings used may especially be: Electrogalvanised steel, hot-dip-galvanised steel, Galvalume®, Galfan® and Galvannealed®.

Today, many components, car bodies including the bodies e.g. of busses and lorries or any mounted metallic parts consist of at least two different metallic materials as surface materials which may be metallic coatings, metallic sheets, metallic parts or joined metallic elements. Therefore, there may be metallic surfaces one beneath the other, that belong to different alloys or even to significantly different metallic materials e.g. like steel, zinc-coated steel or aluminium alloys. Processes for coating such "multi-metal" applications must be able to coat the different metallic materials with an adequate coating quality, especially for corrosion resistance and paint adhesion, which is often not self-understanding.

It has been found that many siloxane compositions, especially such with two significantly chemically different silicon compounds like mixtures containing at least one organosiioxane with at least one group e.g. selected from amino groups, epoxy groups, glycidoxy groups, hydroxy groups, isocyanato groups, mercapto groups, (meth)acrylato groups, (poly)sulfur groups, thiol groups, ureido groups, vinyl groups and vinylbenzene groups, and at least one siloxane with multifunctional groups showing at least two silyl groups per molecule are especially suitable for such multi-metal applications.

According to the process of the invention, the siloxane composition may even be successfully applied to at least one surface of at least one part showing at least two different materials at its surface(s), being made of at least one metallic material, of at least one plastics material like a foil, multilayer, sheet or component of plastics material, of at least one glass material, of at least one ceramic material, of at least one wooden material or of any mixture of these.

According to the process of the invention, the siloxane composition used for the coating A, B, C or any combination of these may be applied to at least one metallic surface of at least one sheet, to at least one complex formed part, to at least one massive part or any mixture of these. The siloxane composition may especially be applied to at least one metallic surface of a coil, of a metallic sheet, of a car body including bodies e.g. of busses and lorries, of parts of a car, of a body of an aerospace, of a ship, of offshore-equipment, of a railcar or of any parts of them, of parts or composed parts for construction, furniture, devices, equipment or specific elements like lamps—especially either during production or after damage or after long-term use. Further on, the repair process may not only be applied for the repair of freshly produced components during production, but even for a repair e.g. after any damage or when removing rust during the lifetime of these components. Therefore, the repair process according to the invention may be even used e.g. in a workshop for car repair or in the repair of construction elements like bridges or of offshore aggregates after long-time use.

According to the process of the invention, the at least one corrosion protecting coating A has been removed at least partially in the area Z e.g. by grinding, sanding, sandblasting or paint stripping or any combination of them. The coating(s) A may be removed partially or totally 1. by only removing a part of the top of the top coating of the corrosion protecting coating(s) A, 2. by only removing the corrosion protecting coating A on top of at least two corrosion protecting coatings A or 3. by removing at least two or even all corrosion protecting coatings A or 4. by removing all corrosion protecting coatings and part of the metallic surface, 5. perhaps even by removing a further intermediate layer of the pretreatment of the metallic surface(s). Often, there will be any combination of these types of removals 1. to 5. Often, there is only the corrosion protecting coating A on the top of at least two corrosion protecting coatings A removed at the outer rim of the removal area Z where the removal of the coatings A is less strong. Often, the only one existing corrosion protecting coating A respectively all the corrosion protecting coatings A are totally removed in the middle of the removal area Z. Then there is often even a removal of the surface part of the metallic surface in the middle of the removal area Z. Often, even the very thin zinc-rich metallic coatings are totally removed in the middle of the removal area Z.

According to the process of the invention, at least one corrosion protecting coating C is applied upon the thin film B whereby the coating C is generated with an organic composition like a primer, a wet-primer, an e-coat, a powder coat, a base-coat or a clear-coat or with a coating with the same or with another siloxane composition as for the thin film B or with a composition intermediate between the composition of an organic coating and a siloxane/polysiloxane coating or with a succession of applications of such compositions, whereby at least one coating C may optionally be applied on a great portion or on the total surface of the coated metallic part. In several cases that are to be foreseen, there will be used at least one composition for the production of at least one organic coating C like a primer, perhaps followed by a base-coat and perhaps even then followed by a clear-coat. In other cases, there will be used at least one composition for the production of at least one organic coating C like a base-coat, perhaps followed by a clear-coat. On the other hand, in the future perhaps there may repair methods be used by selecting a composition for a coating C containing at least one silicon compound selected from silanes, silanols, siloxanes and polysiloxanes, whereby in many cases the content of the at least one silicon compound may be at least 30% by weight of the total of solids in the solution or dispersion of this composition, in some cases at least 40% by weight of the total of solids in the solution or dispersion of this composition, in several cases at least 50% by weight of the total of solids in the solution or dispersion of this composition, in several cases even at least 60% by weight of the total of solids in the solution or dispersion of this composition, in few cases at least 70% by weight of the total of solids in the solution or dispersion of this composition, in few cases at least 80% by weight of the total of solids in the solution or dispersion of this composition, in few cases at least 90% by weight of the total of solids in the solution or dispersion of this composition, in very few cases at least 95% by weight of the total of solids in the solution or dispersion of this composition, in singular cases even at least 98% by weight of the total of solids in the solution or dispersion of this composition. In specific embodiments of this invention, the coating C may contain constituents as typically contained in organic coatings and at the same time may contain constituents as typically contained in coatings formed from siloxane compositions. Such coatings may more or less be intermediate in their compositions and in their properties between organic coatings and coatings prepared from siloxane compositions.

According to the process of the invention, the composition for at least one coating A containing at least one silicon compound selected from silanes, silanols, siloxanes and polysiloxanes may in many cases show a content of the at least one silicon compound may be at least 30% by weight of the total of solids in the solution or dispersion of this composition, in some cases at least 40% by weight of the total of solids in the solution or dispersion of this composition, in several cases at least 50% by weight of the total of solids in the solution or dispersion of this composition, in several cases even at least 60% by weight of the total of solids in the solution or dispersion of this composition, in few cases at least 70% by weight of the total of solids in the solution or dispersion of this composition, in few cases at least 80% by weight of the total of solids in the solution or dispersion of this composition, in few cases at least 90% by weight of the total of solids in the solution or dispersion of this composition, in very few cases at least 95% by weight of the total of solids in the solution or dispersion of this composition, in singular cases even at least 98% by weight of the total of solids in the solution or dispersion of this composition.

According to the process of the invention, the composition for at least one coating B containing at least one silicon compound selected from silanes, silanols, siloxanes and polysiloxanes may in many cases show a content of the at least one silicon compound may be at least 30% by weight of the total of solids in the solution or dispersion of this composition, in some cases at least 40% by weight of the total of solids in the solution or dispersion of this composition, in several cases at least 50% by weight of the total of solids in the solution or dispersion of this composition, in several cases even at least 60% by weight of the total of solids in the solution or dispersion of this composition, in few cases at least 70% by weight of the total of solids in the solution or dispersion of this composition, in few cases at least 80% by weight of the total of solids in the solution or dispersion of this composition, in few cases at least 90% by weight of the total of solids in the solution or dispersion of this composition, in very few cases at least 95% by weight of the total of solids in the solution or dispersion of this composition, in singular cases even at least 98% by weight of the total of solids in the solution or dispersion of this composition.

According to the process of the invention, the siloxane composition for the generation of the corrosion protecting coating(s) A, B, C or any combination of them are solutions or dispersions that contain at least one silicon compound selected from the group of silanes, silanols, siloxanes and polysiloxanes. More preferred, the total content of the at least one silicon compound is in the range of 0.1 to 250 g/L, more preferred in the range of 2 to 180 g/L, much more preferred in the range of 10 to 120 g/L, e.g. about 0.2, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116 or 118 g/L. Preferably, at least one silane, at least one silanol, at least one siloxane, at least one polysiloxane or any of these mixtures is chosen which is compatible with water, i.e. that the at least one silicon compound and, where appropriate, its hydrolysis products, its condensation products and its reaction products are miscible with the components of the aqueous composition without problems and are stable for at least several weeks. Preferably, it allows the formation of a defect-free wet film and dry film which, in particular, is essentially closed, essentially uniform and free from craters. In particular, at least one silane, at least one silanol, at least one siloxane, at least one polysiloxane, their derivatives, any of their reaction products or any of their mixtures is chosen which renders possible a high corrosion resistance and high adhesion to the coating C. Such chemical reaction may occur between any constituents present in the solution or dispersion, even with further added or present components like additives or impurities.

The siloxane composition may more preferred contain predominantly at least one silane, at least one silanol, at least one siloxane, at least one polysiloxane, their derivatives, their reaction products or any of their mixtures in an aqueous solution or dispersion or in a solution or dispersion containing water and optionally at least one organic solvent. The presence of at least one silane, at least one silanol, at least one siloxane, at least one polysiloxane, their derivatives, their reaction products or any of their mixtures offers the advantage that chemical bonds like covalent bonds or ionic bonds are formed between the substrate and the dried protective film and to primer/paint layers or to other organic or siloxane/polysiloxane coatings possibly subsequently applied, as a result of which an improved "paint" adhesion is also achieved. A further advantage is that suitable silanes/silanols/siloxanes/polysiloxanes generate crosslinkings like chemical bonds within the dried protective film, which often considerably improve the strength and the adhesion to the substrate, as a result of which an improved adhesion is achieved in many paint systems.

Preferably, the siloxane composition suitable for the coating(s) A, B, C or any combination of these contains at least one acyloxysilane, one alkoxysilane, one silane with at least one amino group such as an aminoalkylsilane, one silane with at least one succinic acid group or succinic acid anhydride group, one bis-silyl-silane, one silane with at least one epoxy group such as a glycidoxysilane, one (meth)acrylato-silane, one multi-silyl-silane, one ureidosilane, one vinylsilane, at least one of its silanols, at least one of its siloxanes, at least one of its polysiloxanes, at least one of their derivatives, at least one of their reaction products or any of their mixtures. The reaction products of the silanes are known in principle in such systems and are therefore not mentioned individually. They are therefore also not referred to further in the following.

The siloxane composition may contain e.g. at least one silane mixed with a content of at least one alcohol, such as ethanol, methanol or propanol or any mixture of them, e.g. of up to 8 wt. %, based on the silane content, preferably up to 5 wt. %, particularly preferably up to 1 wt. %, very particularly preferably up to 0.5 wt. %, in particular in a mixture a) of at least one aminosilane, such as e.g. bis-amino-silane or mono-amino-silane, with at least one alkoxysilane, such as e.g. trialkoxysilylpropyl-tetrasulfane, or b) one vinylsilane and one bis-silyl-aminosilane or one bis-silyl-polysulfursilane or one bis-silyl-aminosilane or c) one aminosilane and one multi-silyl-functional (=multifunctional) silane like e.g. bis-silyl-alkane or any of its corresponding silanols, siloxanes, polysiloxanes, their derivatives, their reaction products or any of their mixtures. In general, those silanes/silanols/siloxanes/polysiloxanes which have an alkyl group especially with a chain length in the range from 1 to 8 C atoms and which contain a functional group which is suitable for reaction with a polymer are preferred in particular.

The siloxane composition preferably contains at least one silicon compound chosen from the group consisting of:
3-glycidoxyalkyltrialkoxysilane,
3-methacryloxyalkyltrialkoxysilane,
3-(trialkoxysilyl)alkyl-succinic acid-silane,
aminoalkylaminoalkylalkyldialkoxysilane,
beta-(3,4-epoxycycloalkyl)alkyltrialkoxysilane,
(3,4-epoxycycloalkyl)alkyltrialkoxysilane,
bis(trialkoxysilylalkyl)amine,
bis(trialkoxysilyl)ethane,
(3,4-epoxyalkyl)trialkoxysilane,
gamma-aminoalkyltrialkoxysilane,
gamma-methacryioxyalkyltrialkoxysilane,
gamma-ureidoalkyltrialkoxysilane,
glycidoxyalkyltrialkoxysilane,
N-(3-trimalkoxysilyl)alkyl)alkylenediamine,
N-beta-(aminoalkyl)-gamma-aminoalkyltrialkoxysilane,
N-(gamma-trialkoxysilylalkyl)dialkylenetriamine,
polyaminoalkylalkyldialkoxysilane,
tris(3-trialkoxysilyl)alkyl)isocyanurate,
ueidopropyltrialkoxy)silane,
vinyltriacetoxysilane
and any of its corresponding silanols, siloxanes, polysiloxanes, their derivatives and reaction products.

The siloxane composition preferably contains at least one silicon compound chosen from the group consisting of:
3-aminopropyl)silanetriol,
3-glycidoxypropyltriethoxysilane,
3-glycidoxypropyltrimethoxysilane,
3-glycidyloxypropyltrialkoxysilane,
3-methacryloxypropyltriethoxysilane,
3-methacryloxypropyltrimethoxysilane,
3-(triethoxysilyl)propyl-succinic acid-silane,
aminoethylaminopropylmethyldiethoxysilane,
aminoethylaminopropylmethyldimethoxysilane,
aminopropyltrialkoxysilane,
beta-(3,4-epoxycyclohexyl)ethyltriethoxysilane,
beta-(3,4-epoxycyclohexyl)ethyltrimethoxysilane,
beta-(3,4-epoxycyclohexyl)methyltriethoxysilane,
beta-(3,4-epoxycyclohexyl)methyltrimethoxysilane,
bis-1,2-(triethoxysilyl)ethane,
bis-1,2-(trimethoxysiiyi)ethane,
(3,4-epoxycyclohexyl)propyltriethoxysilane,
(3,4-epoxycyclohexyl)propyltrimethoxysilane,
bis(triethoxysilylpropyl)amine,
bis(trimethoxysilylpropyl)amine,
(3,4-epoxybutyl)triethoxysilane,
(3,4-epoxybutyl)trimethoxysilane,
gamma-aminopropyltriethoxysilane,
gamma-aminopropyltrimethoxysilane,
gamma-methacryloxypropyltriethoxysilane,
gamma-methacryloxypropyltrimethoxysilane,
gamma-ureidopropyltrialkoxysilane,
N-(3-(trimethoxysilyl)propyl)ethylenediamine, N-beta-(aminoethyl)-gamma-aminopropyltriethoxysilane,
N-beta-(aminoethyl)-gamma-aminopropyltrimethoxysilane,
N-(gamma-triethoxysilylpropyl)diethylenetriamine,
N-(gamma-trimethoxysilylpropyl)diethylenetriamine,
N-(gamma-triethoxysilylpropyl)dimethylenetriamine,
N-(gamma-trimethoxysilylpropyl)dimethylenetriamine,
polyaminoalkylethyldialkoxysilane,
polyaminoalkylmethyldialkoxysilane,
tris(3-(triethoxysilyl)propyl) isocyanurate,
tris(3-(trimethoxysilyl)propyl) isocyanurate,
vinyltriacetoxysilane
and any of its corresponding silanols, siloxanes, polysiloxanes, their derivatives and reaction products.

According to the process of the invention, the siloxane compositions for the generation of the corrosion protecting coating(s) A, B, C or any combination of them are solutions or dispersions that contain a content of at least one partially hydrolysed silane, of at least one totally hydrolysed silane, of at least one oligomeric siloxane, of at least one polymeric siloxane, of at least one polysiloxane or of any mixture of these. More preferred, these compositions contain a content of at least one oligomeric siloxane and of at least one polymeric siloxane. If there is the need of a higher viscosity, there may be added at least one compound selected from the group of organic monomers, organic oligomers, organic polymers, at least one thickening agent like a fine-crystalline silicate like any clay or clay-like material like bentonite, fireclay, kaolinite and zeolithe, any borate, any oxide e.g. like nanocrystalline $SiO_2$, any organic substance or any mixture containing organic substance e.g. selected from the group of organic materials on the base of cellulose, (meth)acrylate, (poly)saccharide, starch, and polysiloxane.

According to the process of the invention, the siloxane compositions for the generation of the corrosion protecting coating(s) A, B, C or any combination of them are solutions or dispersions that contain a content of at least one organosilicon compound having at least one group e.g. selected from amino groups, epoxy groups, glycidoxy groups, hydroxy groups, isocyanato groups, mercapto groups, (meth)acrylato groups, (poly)sulfur groups, thiol groups, ureido groups, vinyl groups and vinylbenzene groups and at least one multifunctional silicon compound having at least two silyl groups per molecule. More preferred, these compositions are aqueous solutions or dispersions showing a) a content of at least one organosilicon compound having at least one group e.g. selected from amino groups, epoxy groups, glycidoxy groups, hydroxy groups, isocyanato groups, mercapto groups, (meth)acrylato groups, (poly)sulfur groups, thiol groups, ureido groups, vinyl groups and vinylbenzene groups in a content in the range of 0.1 to 120 g/L, more preferred in the range of 0.5 to 80 g/L, much more preferred in the range of 1 to 50 g/L, e.g. about 0.1, 0.2, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116 or 118 g/L, and b) a content of at least one multifunctional silicon compound having at least two silyl groups in the range of 0.1 to 120 g/L, more preferred in the range of 0.5 to 80 g/L, much more preferred in the range of 1 to 50 g/L, e.g. about 0.1, 0.2, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116 or 118 g/L.

According to the process of the invention, the siloxane compositions for the generation of the corrosion protecting coating(s) A, B, C or any combination of them are solutions or dispersions that contain at least one silicon compound selected from silanes, silanols, siloxanes and polysiloxanes as well as a content of at least one organic compound that is an organic monomer, an organic oligomer, an organic polymer, an organic copolymer, an organic blockcopolymer or any mixture of these. More preferred, these compositions are aqueous solutions or dispersions showing a content of at least one organic material, especially in the range of 0.01 to 180 g/L, more preferred in the range of 0.05 to 30 g/L, e.g. about 0.1, 0.2, 0.5, 1, 2, 3, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 120, 124, 128, 132, 136, 140, 144, 148, 152, 156, 160, 164, 168, 172 or 176 g/L. The weight ratio of the at least one organic compound to the at least one silane/silanol/siloxane/polysiloxane may be in the range from 0.001:1 to 4:1, preferably in the range from 0.051 to 2.5:1, more preferred in the range from 0.1:1 to 1.8:1, most preferred in the range from 0.2:1 to 1.5:1, especially in the range of about 0.3:1, about 0.4:1, about 0.5:1, about 0.6:1, about 0.7:1, about 0.8:1, about 0.9:1, about 1:1, about 1.1:1, about 1.2:1, about 1.3:1 or about 1.4:1. In some embodiments, there may be at least one fluoride, at least one complex fluoride or both be added to such mixtures. Further on, the organic film-forming agent to be used for the organic coating or the organic coating may in some cases preferably contain at least one component based on:

a) monomers, oligomers, polymers, copolymers, blockcopolymers or any of their mixtures, each being preferably based on:
    acryl, butadiene, epoxy, ethylene, melamine, methacryl, polycarbonate, polyester, polyether, polyurethane, styrene, vinyl or any mixture of these, b) or based on copolymers, preferably of:
    acrylic-polyester-polyurethane copolymer,
    acrylic-polyester-polyurethane-styrene copolymer,
    acrylic acid ester,
    acrylic acid ester-methacrylic acid ester, optionally with free acids or acrylonitrile,
    ethylene-acrylic mixture,
    ethylene-acrylic copolymer,
    ethylene-acrylic-polyester copolymer,
    ethylene-acrylic-polyurethane copolymer,
    ethylene-acrylic-polyester-polyurethane copolymer,
    ethylene-acrylic-polyester-polyurethane-styrene copolymer,
    ethylene-acrylic-styrene copolymer,
    polyester resins with free carboxyl groups combined with melamine-formaldehyde resins,
    a synthetic resin mixture or/and copolymer based on acrylate and styrene,
    a synthetic resin mixture or/and copolymer based on styrene-butadiene,
    a synthetic resin mixture or/and copolymer of acrylate and epoxide, based on an acrylic-modified polyester containing carboxyl groups together with melamine-formaldehyde and ethylene-acrylic copolymer,
    polycarbonate-polyurethane,
    polyester-polyurethane,
    styrene,
    styrene-vinyl acetate,
    vinyl acetate,
    vinyl ester,
    vinyl ether
or any mixture of these or on any mixture of a) and b).

According to the process of the invention, the siloxane compositions for the generation of the corrosion protecting coating(s) A, B, C or any combination of them are solutions or dispersions that contain at least one silicon compound selected from silanes, siloxanes and polysiloxanes as well as a content of at least one acid like acetic acid, glacial acetic acid, another carbonic acid, sulphuric acid, hydrochloric acid, nitric acid, fluoric acid, any phosphorus containing acid or any mixture of these. More preferred, these compositions are aqueous solutions or dispersions showing only a small content of at least one acid, most preferred in the range of 0.1 to 50 g/L, especially in the range of 0.15 to 30 g/L, e.g. about 0.5, 1, 2, 4, 8, 12, 16, 20, 24, 26, 28, 30, 32, 34, 36, 38, 40, 42, 44, 46 or 48 g/L or even no content of any acid. The content of acids may be added to the composition or may be produced by chemical reactions in the composition e.g. by the reaction of at least one silicon compound with water during hydrolysis.

According to the process of the invention, the siloxane compositions for the generation of the corrosion protecting coating(s) A, B, C or any combination of them are solutions or dispersions that contain at least one silicon compound selected from silanes, siloxanes and polysiloxanes as well as a content of at least one organic solvent like an alcohol like methanol, ethanol, propanol or any mixture of these. More preferred, these compositions are aqueous solutions or dispersions showing only a small content of at least one organic solvent, most preferred in the range of 0.1 to 200 g/L, especially in the range of 1 to 150 g/L, e.g. about 0.5, 1, 2, 4, 8, 12, 16, 20, 24, 28, 32, 36, 40, 44, 48, 52, 56, 60, 64, 68, 72, 76, 80, 84, 88, 92, 96, 100, 104, 108, 112, 116, 120, 124, 128, 132, 136, 140, 144 or 148 g/L or even no content of organic solvent.

According to the process of the invention, the siloxane compositions for the generation of the corrosion protecting coating(s) A, B, C or any combination of them are solutions or dispersions that contain at least one silicon compound selected from silanes, silanols, siloxanes and polysiloxanes as well as a content of at least one compound containing titanium, hafnium, zirconium, aluminium or boron or even any mixture of these. More preferred, there is an addition of at least one compound selected from compounds of complex fluorides or carbonates or nitrates or organic compounds of titanium, hafnium, zirconium, aluminium and boron or any mixture of these. Preferably, these compositions are aqueous solutions or dispersions showing a content of at least one compound containing titanium, hafnium, zirconium, aluminium or boron or even any mixture of these in the range of 0.01 to 100 g/L, more preferred in the range of 0.05 to 50 g/L, e.g. about 0.1, 0.2, 0.5, 1, 2, 3, 4, 6, 8, 10, 12, 14, 16, 18, 20, 22, 24, 26, 28, 30, 32, 34, 36, 38, 40, 42, 44, 46 or 48 g/L. The weight ratio of the silanes/silanols/siloxanes/polysiloxanes to the sum of compounds containing titanium, hafnium, zirconium, aluminium and boron may preferably be in the range from 0.01:1 to 6:1, preferably in the range from 0.05:1 to 4.5:1, more preferred in the range from 0.1:1 to 2.8:1, most preferred in the range from 0.2:1 to 2.5:1, especially in the range of about 0.3:1, about 0.4:1, about 0.5:1, about 0.6:1, about 0.7:1, about 0.8:1, about 0.9:1, about 1:1, about 1.1:1, about 1.2:1, about 1.3:1, about 1.4:1, about 1.5:1, about 1.6:1, about 1.7:1, about 1.8:1, about 1.9:1, about 2.0:1, about 2.1:1, about 2.2:1, about 2.3:1 or about 2.4:1. In some embodiments, there may be at least one fluoride, at least one complex fluoride or both be added to such mixtures.

According to the process of the invention, the siloxane compositions for the generation of the corrosion protecting coating(s) A, B, C or any combination of them are solutions or dispersions that contain at least one silicon compound selected from silanes, silanols, siloxanes and polysiloxanes as well as a content of at least one additive selected from the group of particles with a grain size below one micron of all or of nearly all particles, surfactants like at least one non-ionic surfactant, dyes, fluorescing agents, biocides, pH adjusting agents, chelates, crosslinkers suitable for chemical crosslinking upon thermal influence, photoinitiators and substances for the generation of a gel. The particles may be inorganic particles or organic particles or both. These particles may be corrosion protection agents, electrically conductive, coloured or colour-free. The surfactants may aid in the improvement of the wettability and in the homogeneity of the generated thin film. The coloured particles, the dyes, the fluorescing agents or any mixture of these may help to increase the visibility of the generated thin film, which is typically not to be seen or is only be seen as a milky film or a film with a different glance or without any colouring with the naked eye or without any optical aids like UV light. The pH adjusting agents like any acid(s) or any basic substance like $NH_3$ solution may aid to lower or increase the pH. The biocides may help to suppress biological activity and further chemical variation which may negatively influence the performance of the compositions. The chelating agents may serve in particular to stabilize metallic compounds present in water. They are particularly suitable if they have only a low reactivity in the aqueous composition and if they are at least partly decomposed within the process conditions used and the metal ions for the bonding or chemical reaction are liberated. If they are too reactive, the organometallic compounds may react prematurely with other chemical compounds, such as silanes. Preferably, the chelates are hydrophilic, stable to hydrolysis, stable to water, form stable hydrolysates or show any mixture of these properties. Preferably, a silane or a chelate or both is/are chosen which is/are compatible with water and moreover in such cases together with an organic film-forming agent is chosen and which has the same properties as mentioned before for the silane or for the chelate. The crosslinkers for chemical networking by application of a higher temperature, often in the range from 80 to 300° C., like compounds on the base of isocyanate, isocyanurate, melamine or any mixture of them, help to generate a denser network by chemical reaction at higher temperature. The photoinitiators may help to generate denser networks with the aid of radical polymerisation if there are adequate monomers, oligomers, polymers, copolymers, blockcopolymers or any of their mixtures present. More preferred, these compositions are aqueous solutions or dispersions showing a content of at least one type of additive of the group mentioned above in the range of 0.01 to 150 g/L for each additive type as mentioned in the group above, more preferred in the range of 0.5 to 120 g/L each, e.g. about 1, 2, 3, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116 or 118 g/L each.

The at least one metal chelate is preferably chosen from chelate complexes based on acetylacetonates, acetoacetates, acetonates, alkylenediamines, amines, lactates, mono-carboxylic acids, bis-carboxylic acids, citrates, glycols or any of their mixtures. The at least one metal chelate is preferably based on:
  acetylacetonate,
  acetoacetate.
  di-n-alkoxy-bisalkyl acetoacetate,
  hydroxyalkylenediamine triacetate,
  trialkanolamine,
  trialkylenetetramine alkali metal lactate,
  alkanolamine,
  alkyl acetatoacetate,
  alkylenediamine tetraacetate, ammonium lactate,
citrate,
dialkyl citrate,
dialkyl ester-citrate,
dialkylenetriamine,
diisoalkoxybisalkyl acetoacetate,
diisopropoxybisalkyl
or any mixture of these.

According to the process of the invention, the siloxane compositions for the generation of the corrosion protecting coating(s) A, B, C or any combination of these are solutions or dispersions that contain at least one silicon compound selected from silanes, silanols, siloxanes and polysiloxanes as well as a content of at least one nitrogen containing agent like nitrate, nitrite or a guanidine compound like nitroguanidine. Such nitrogen containing agent may contain at least one nitrogen containing group or may release such groups. More preferred, these compositions are aqueous solutions or dispersions showing a content of at least one agent in the range of 0.01 to 60 g/L, more preferred in the range of 0.05 to 40 g/L, e.g. about 0.1, 0.2, 0.5, 1, 2, 3, 4, 6, 8, 10, 12, 14, 16, 18, 20, 22, 24, 26, 28, 30, 32, 34, 36 or 38 g/L.

According to the process of the invention, the siloxane compositions for the generation of the corrosion protecting coating(s) A, B, C or any combination of them are solutions or dispersions that contain at least one silicon compound selected from silanes, silanols, siloxanes and polysiloxanes that has at least one functional group selected from the group consisting of amino, epoxy, glycidoxy, isocyanato, mercapto, (meth)acrylato, (poly)sulfur, ureido, vinyl and vinylbenzene.

According to another aspect of the invention, a tool suitable for applying a process according to the invention contains and dispenses a composition which is a solution or dispersion containing at least one silicon compound selected from silanes, silanols, siloxanes and polysiloxanes. More preferred, the tool contains a composition which contains predominantly at least one silicon compound.

According to a further aspect of the invention, a tool suitable for applying a process according to claim 1 is a spray can, a spray instrument or a stick having a storage chamber containing a composition which is a solution or dispersion containing at least one silicon compound selected from silanes, silanols, siloxanes and polysiloxanes. More preferred, the tool contains a composition which contains predominantly at least one silicon compound.

According to a further aspect of the invention, a tool suitable for applying a process according to claim 1 contains a paste which is a composition containing at least one silicon compound selected from silanes, silanols, siloxanes and polysiloxanes and whereby the tool transmits or releases a portion of the paste when it is brought into contact with the surface to be coated. More preferred, the tool contains a composition which contains predominantly at least one silicon compound.

Such tools may contain the siloxane composition in a concentration adequate for the coating of the removal area Z. Preferably, this concentration is adequate to generate a wet film and dry film of adequate wet film thickness and of adequate dry film thickness. The required corrosion protection and adhesion may be gained during drying or during drying and crosslinking or during drying and chemical reacting.

With the process of the invention, it is possible to use the following repair process successions:

A) First, the siloxane composition may be applied onto the removal area Z at least partially. Then, a coating C may be applied more or less in the region of the removal area Z with a composition like a repair primer or a surface primer or a further siloxane composition or any mixture between an organic and a siloxane composition. It may be sometimes necessary to level this area coated with the coating C e.g. by grinding or lapping, especially so that there are no edges to be seen at the boarder of these coatings, even perhaps under a further paint coating. It was found that such a system with a primer as coating C shows an astonishingly high corrosion resistance and a better paint adhesion than the system as typically used without any siloxane composition.

B) Alternatively, first, the siloxane composition was applied onto the removal area Z at least partially. Then, no coating C like a repair primer or a surface primer was used in the region of the removal area Z. Instead of this, a further coating was applied all over the metallic sheet resp. part, covering in the repair zone even the coating B prepared with the siloxane composition. Then, there is the possibility, but no necessity, to equalize the depth generated in the removal area Z e.g. by applying a greater coating thickness of this coating which may be applied e.g. by a base-coat or a clear-coat or a combination of these. This has the advantage, to save the process step of applying the repair primer resp. surface primer and even to level this area e.g. by grinding or lapping. Nevertheless, the corrosion resistance of this multilayer system seems to be a bit better than the normal unrepaired paint system just beneath. For the repair of coated metallic material e.g. of constructions like bridges, furniture, devices and equipment, in the repaired areas the primer coatings C and perhaps even a next primer coating may be thinner than normal so that costs could be further reduced.

It was surprising that it was possible—e.g. only by spraying or with an easy tool like a sponge—to apply a siloxane composition to generate a thin film B without any practical problems and without any loss of coating quality although there was a manual application which handling was only partially controlled. Even for an application of an aqueous siloxane containing solution by manual handling, where an inhomogeneous or partially insufficient thick coating may perhaps occur, no problem occurred showing indications for a non-coated and therefore not corrosion-protected area or for too thin or too thick coated areas. Therefore, it looks like that even for the manual handling of a tool no situation does occur easily where there remain insufficiently protected areas of the coating B. This means that the manual application process seems to be a robust process.

It was further surprising that a process may be developed which may be—especially during car body preparation in car production—applied in-line. Up to now, a repair of painted car bodies with at least one repair area per car body, which is necessary for a certain, sometimes even very high percentage of car bodies, is typically carried out by separating such car bodies and repair them in separate areas. Due to the possibility of an easier and quicker application of the siloxane composition than of the actually used coatings, the repair process may proceed immediately and in-line.

Additionally, it was surprising that a siloxane composition according to the invention shows a good corrosion resistance and paint adhesion when this composition is applied without a prior cleaning step and without applying as a further coating an e-coat, a repair primer, another type of primer or paint or any combination of these, for example in at least two coatings. This result was as outstanding, as at least one coating B was applied with the aid of a siloxane composition that typically allows the generation of a dry film thickness in the range from 0.01 to 0.1 µm of the coating B and as e.g. the corrosion resistance is strongly a function of the coating thickness. Typically, a single primer or paint coating shows a dry film thickness in the range from 10 to 50 μm. Typically, the paint system as multiplayer of mostly at least three coatings one above the other of at least one primer or e-coat and of at least one paint has a thickness in the dry state in the range from 30 to 150 μm. For such dry film thicknesses, it is no problem to generate a good corrosion resistance.

SPECIFIC EXAMPLES AND COMPARISON EXAMPLES

The following sections describe specific examples and comparison examples with the target to show some of the possible process varieties, composition varieties and the effects related thereto more in detail and not to limit the invention.

Section 1: Preparation of the Coated Metal Sheets and Application of the Repair Coating B For each test, fifteen metal sheets from hot-dip-galvanised steel were taken having a zinc phosphate coating and an e-coat electrocoated on the zinc phosphate coating. The thickness of the zinc phosphate coating was about 6 μm, the thickness of the e-coat was about 20 μm. In the middle of each such coated metal sheet, these coatings were sanded so that there the blank metal sheet was to be seen in the middle of the sheet, of which a thin metal surface has been removed by sanding, too. Then, immediately after sanding, a clean wipe releasing no fibers and no pieces of fluff was impregnated with pure water so that is was wet. This wet clean wipe was used to wipe along the whole removal areas Z to clean them thoroughly from dust and from further fine parts that remained from the sanding. Then these areas were dried with a further clean wipe so that there was no or only a very thin water film remaining. Then, immediately after cleaning, the siloxane composition was applied to the removal areas Z to generate a coating B on the freshly prepared and clean removal areas.

Then in Test 1, this metallic surface as well as small rims of it were coated with an aqueous siloxane composition of a mixture of silanes/silanols/siloxanes with a high content of amino groups and of titanium hexafluoride in a weight ratio of 1:3. This siloxane composition was sprayed on to the center of the removal area Z in such way that there was generated a dry film on the whole blank metallic surface as well as on a small neighbouring rim of the coated area where the coating B was reduced in thickness by sanding. These parts of the removal area Z, but not all of the sanded parts of the removal area Z, were coated with this coating B. There was no thin film B sprayed on to non-sanded parts outside the removal area Z. The generated coatings B were totally and obviously homogeneously coated with a dry film thickness of about 25 to about 80 μm thickness depending on and proportional to the concentration of all these additions together in water of 5, 10 resp. 15% by weight. It was further taken care that there did not occur any drops of the silane/silanol/siloxane containing aqueous solution and that the wet film of the siloxane composition was in about homogeneously and of in about equal thickness. This wet thin film B was dried by hot air at 80° C., for 5 minutes to generate a coating B. Then the corrosion resistance as well as the paint adhesion was tested.

In Test 2, the same procedure was undertaken, but additionally, in the siloxane coated removal area Z a repair primer with a thickness of about 20 μm was applied, dried and heated to the temperature of crosslinking. Then, the area of the repair primer was finely grinded to remove thickness differences at its rims. Finally a clear-coat was applied and thermally crosslinked. Then the corrosion resistance as well as the paint adhesion was tested.

In the Tests 3 and 4, the same procedures as in the Tests 1 and 2 were used, but with the difference, that as aqueous siloxane composition an aqueous silane/silanol/siloxane composition was applied containing a mixture of alkoxysilanes/alkoxysilanols/alkoxysiloxanes having amino groups and a mixture of silanes/silanols/siloxanes having predominantly two silyl groups in a weight ratio of 1:1.

What is claimed is:

1. A tool for performing a process for producing a repair coating on at least one metallic surface previously coated with at least one corrosion protection coating A applied from at least one composition selected from the group consisting of:
    A1) at least one pretreatment composition selected from the group consisting of an activator, a passivator, a phosphating composition, a titanium compound, and a zirconium compound;
    A2) an organic composition selected from the group consisting of a primer, a wet-primer, a welding primer, an e-coat, a powder coat, a base-coat, and a clear-coat; and
    A3) a silicon compound containing a composition that is a solution or dispersion containing at least one silicon compound selected from the group consisting of a silane, a silanol, a siloxane, and a polysiloxane,
    whereby the at least one corrosion protection coating A has been at least partially removed in an area Z,
    wherein a thin corrosion protection coating B, containing at least one silicon compound, is applied from a solution or dispersion containing at least one silane, at least one silanol, at least one siloxane, at least one polysiloxane, or any mixture of these, on at least a part of the area Z,
    wherein the solution or dispersion containing at least one silane, at least one silanol, at least one siloxane, at least one polysiloxane, or any mixture thereof, that forms coating film B, is applied a) by spraying or b) by contacting with a tool that contains and dispenses the solution or dispersion containing at least one silane, at least one silanol, at least one siloxane, at least one polysiloxane, or a mixture thereof, and
    wherein the tool is a spray can, a spray instrument, or a stick having a storage chamber for the solution or dispersion containing at least one silane, at least one silanol, at least one siloxane, at least one polysiloxane, or any mixture thereof.

2. A tool according to claim 1, wherein the solution or dispersion containing at least one silane, at least one silanol, at least one siloxane, at least one polysiloxane, or any mixture of these is a paste and whereby the tool transmits or releases a portion of the paste when it is brought into contact with the surface to be coated.

3. A tool for performing a process for producing a repair coating on at least one metallic surface previously coated with at least one corrosion protection coating A applied from at least one composition selected from the group consisting of:
    A1) at least one pretreatment composition selected from the group consisting of an activator, a passivator, a phosphating composition, a titanium compound, and a zirconium compound;
    A2) an organic composition selected from the group consisting of a primer, a wet-primer, a welding primer, an e-coat, a powder coat, a base-coat, and a clear-coat; and
    A3) a silicon compound containing a composition that is a solution or dispersion containing at least one silicon compound selected from the group consisting of a silane, a silanol, a siloxane, and a polysiloxane,
    whereby the at least one corrosion protection coating A has been at least partially removed in an area Z, wherein a corrosion protection coating B, containing at least one silicon compound, is applied from a solution or dispersion containing at least one silane, at least one silanol, at least one siloxane, at least one polysiloxane, or any mixture of these, on at least a part of the area Z, wherein the solution or dispersion containing at least one silane, at least one silanol, at least one siloxane, at least one polysiloxane, or any mixture of these, that forms coating film B, is applied a) by spraying or b) by contacting with a tool that contains and disperses the solution or dispersion containing at least one silane, at least one silanol, at least one siloxane, at least one polysiloxane, or any mixture of these, and wherein the tool is a spray can, a spray instrument, or a stick having a storage chamber for the solution or dispersion containing at least one silane, at least one silanol, at least one siloxane, at least one polysiloxane, or any mixture of these.

4. A tool for performing a process for producing a repair coating on at least one metallic surface previously coated with at least one corrosion protection coating A applied from at least one composition selected from the group consisting of:

A1) at least one pretreatment composition selected from the group consisting of an activator, a passivator, a phosphating composition, a titanium compound, and a zirconium compound;

A2) an organic composition selected from the group consisting of a primer, a wet-primer, a welding primer, an e-coat, a powder coat, a base-coat, and a clear-coat; and A3) a silicon compound containing a composition that is a solution or dispersion containing at least one silicon compound selected from the group consisting of a silane, a silanol and a siloxane;

whereby the at least one corrosion protection coating A has been at least partially removed in an area Z, wherein a thin corrosion protection coating B, containing at least one silicon compound, is applied from a solution or dispersion containing at least one silane, at least one silanol, at least one siloxane, or any mixture of these, on at least a part of the area Z, wherein the solution or dispersion containing at least one silane, at least one silanol, at least one siloxane, at least one polysiloxane, or any mixture of these, that forms coating film B, is applied a) by spraying or b) by contacting with a tool that contains and disperses the solution or dispersion containing at least one silane, at least one silanol, at least one siloxane, or any mixture thereof, and wherein the tool is a spray can, a spray instrument, or a stick having a storage chamber for the solution or dispersion containing at least one silane, at least one silanol, at least one siloxane, at least one polysiloxane, or any mixture of these.

* * * * *